Jan. 10, 1939. C. W. SINCLAIR 2,143,458
METHOD OF FORMING BRAKE SHOES
Filed July 27, 1936 2 Sheets-Sheet 1
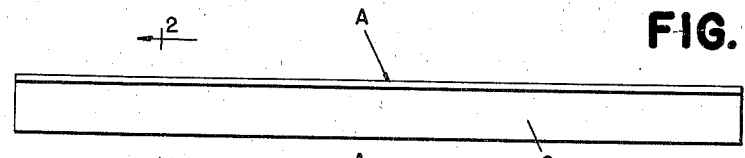
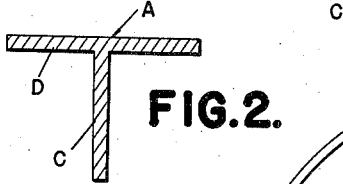
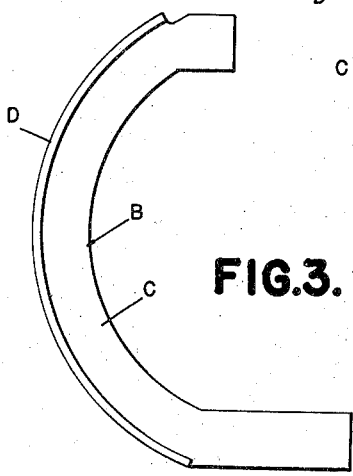
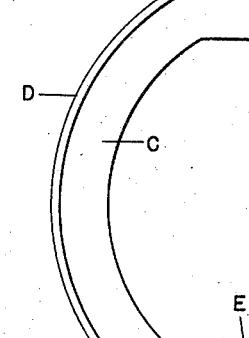
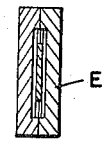
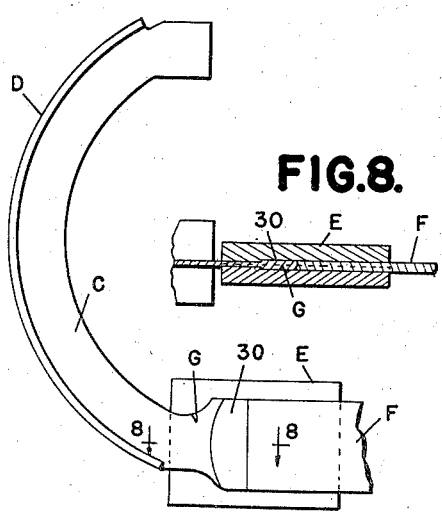
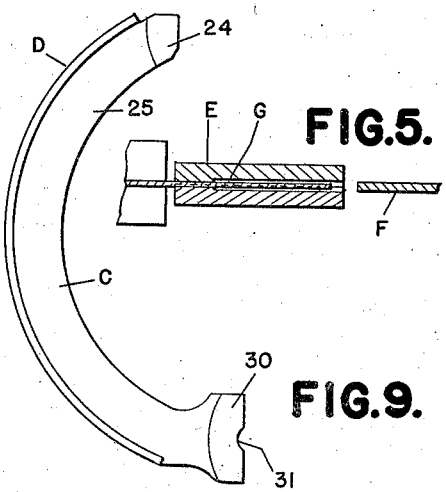
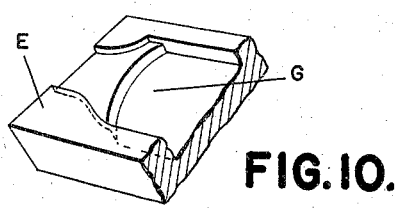
INVENTOR
CHARLES W. SINCLAIR
BY
ATTORNEYS

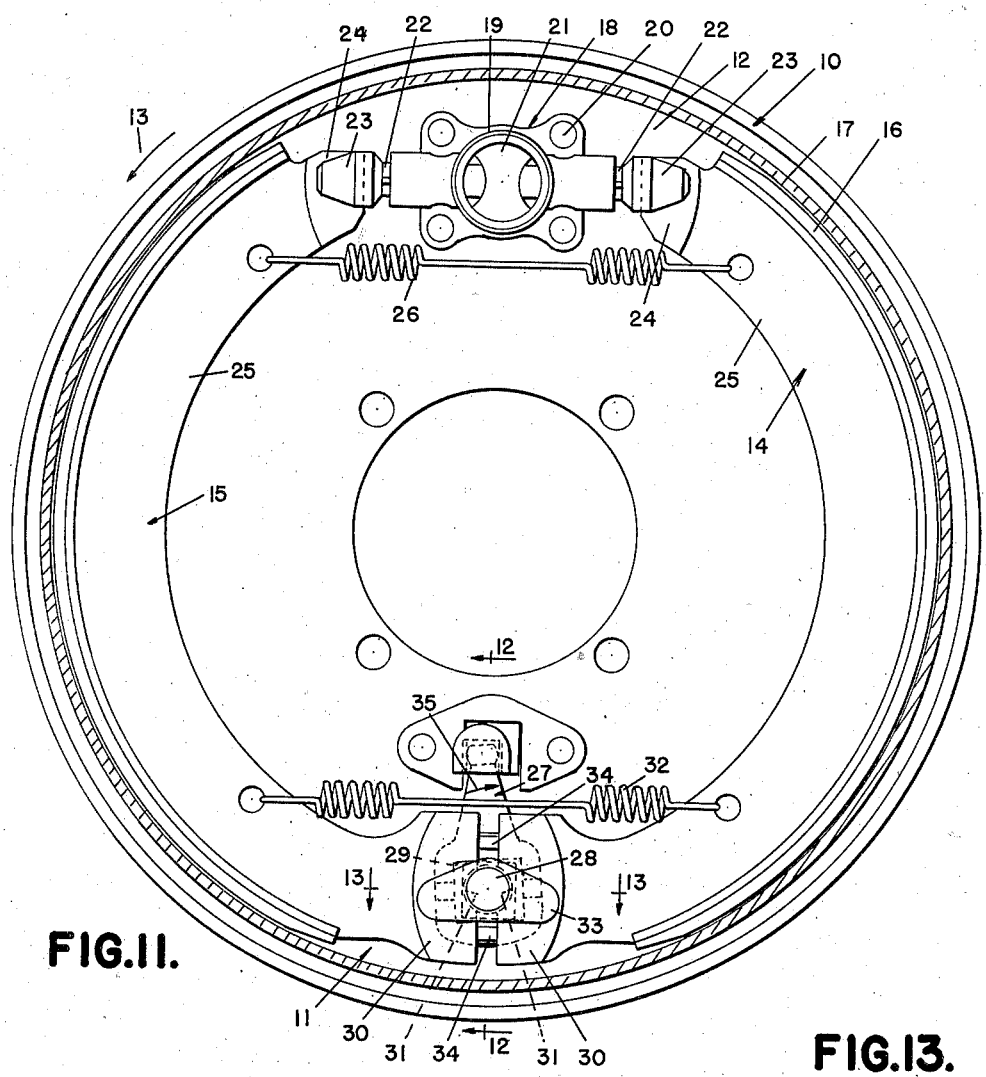
Jan. 10, 1939.  C. W. SINCLAIR  2,143,458
METHOD OF FORMING BRAKE SHOES
Filed July 27, 1936    2 Sheets-Sheet 2
FIG.11.
FIG.13.
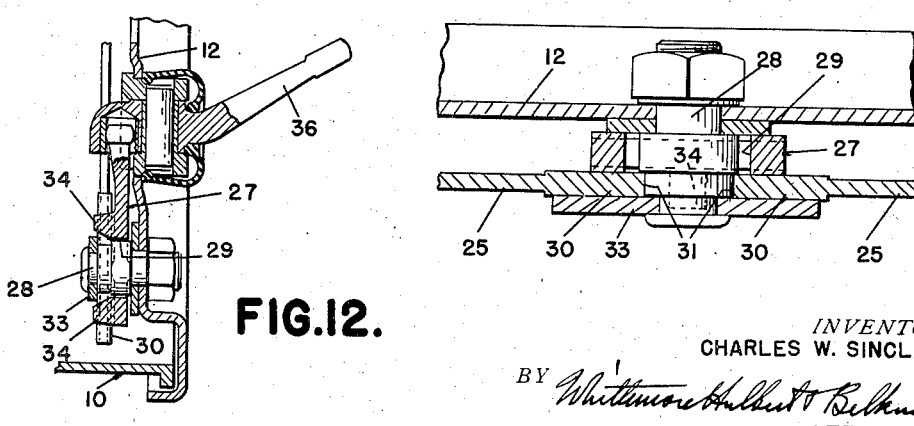
FIG.12.
INVENTOR
CHARLES W. SINCLAIR
BY
ATTORNEYS Patented Jan. 10, 1939

2,143,458

UNITED STATES PATENT OFFICE 2,143,458

METHOD OF FORMING BRAKE SHOES

Charles W. Sinclair, Detroit, Mich., assignor to Kelsey-Hayes Wheel Company, Detroit, Mich., a corporation of Delaware Application July 27, 1936, Serial No. 92,880

4 Claims. (Cl. 29—152.1)

This invention relates generally to brake constructions and refers more particularly to a method of forming brake shoes of the web type.

It is well established that certain types of shoe actuating and adjustment means exert relatively high unit pressures on the ends of the webs of the shoes and have a tendency to deform the shoes to such an extent as to interfere with brake operation. In order to avoid deforming the shoes by the relatively high unit pressures exerted on the ends of the latter, it has been proposed to increase the depth of either or both of the ends of the shoes, and to also increase the thickness of the latter. The provision of brake shoes having relatively deep end portions is of particular importance in cases where shoe spreaders of low ratio are employed to expand the shoes into engagement with the brake drum. This will be apparent when considering that as the leverage ratio of the spreader is reduced, the extent of travel of the spreader required to expand the shoes into engagement with the brake flange is increased and, accordingly, the depth of the ends of the shoes or webs must be correspondingly increased. It has been the practice in the past to either weld pads on the ends of the webs of the shoes, cast the shoes with enlarged ends, or bend the extremities of the axial flanges of the shoes inwardly for engagement with the spreader.

The foregoing methods of procedure appreciably increase the cost of manufacture of the shoes and, furthermore, not only limit the application of the web type shoe to certain types of brakes, but also restrict the method of actuation and the design of the spreader.

It is one of the principal objects of the present invention to improve the method of manufacture of brake shoes having enlarged ends by simplifying the several steps involved, and by reducing the number of such steps to the minimum. It is also an object of this invention to provide a method of forming web type brake shoes suitable for all kinds of shoe brakes regardless of the design or the method of actuation employed.

A still further object of this invention resides in the provision of a method of manufacture rendering it possible to form shoes of the type set forth in the preceding paragraph from mill section stock, and this is desirable since stock of this character is of uniform section and is relatively free from imperfections.

The foregoing, as well as other objects, will be made more apparent as this description proceeds, especially when considered in connection with the accompanying drawings, wherein:—

Figure 1 is a side elevational view of a strip of mill section stock of sufficient length to form a brake shoe;

Figure 2 is a cross sectional view taken substantially on the plane indicated by the line 2—2 of Figure 1;

Figure 3 is a side elevational view showing the blank after the same has been rolled, or otherwise formed to the curvature desired;

Figure 4 is a side elevational view indicating the upsetting operation provided to secure the desired depth and thickness of the ends of the shoes;

Figure 5 is a sectional view taken substantially on the plane indicated by the line 5—5 of Figure 4;

Figure 6 is a cross sectional view taken substantially on the plane indicated by the line 6—6 of Figure 4;

Figure 7 is a side elevational view of the brake shoe subsequent to the upsetting operation;

Figure 8 is a sectional view taken substantially on the plane indicated by the line 8—8 of Figure 7;

Figure 9 is a side elevational view of a completed shoe;

Figure 10 is a fragmentary perspective view of one part of the die employed to upset the ends of the shoes;

Figure 11 is a side elevational view party in section of a brake equipped with shoes constructed in accordance with this invention;

Figures 12 and 13 are sectional views taken substantially on the planes indicated by the lines 12—12 and 13—13, respectively, of Figure 11.

One type of brake with which my improved shoes are particularly suitable is illustrated in Figures 11 to 13 inclusive, and comprises a brake drum 10 and brake mechanism 11 supported within the brake drum on the backing plate 12. In the embodiment of the invention illustrated in the above figures, the brake drum has a forward rotation in the direction of the arrow 13 in Figure 11, and the brake mechanism comprises two shoes 14 and 15 located within the drum with the opposite ends spaced circumferentially from each other. As will be more fully hereinafter set forth, both shoes are formed of T-shaped mill section stock and a lining 16 having the desired co-efficient friction is secured on the flange of the T of each shoe for engagement with the inner surface of the annular brake flange 17 on the drum.

Upon reference to Figure 11, it will be noted that the upper ends of the shoes are anchored to the backing plate 12 by means of an adjustment device 18 having a bracket 19 fixedly secured to the backing plate 12 between the upper ends of the shoes by means of the fastener elements 20. The bracket 19 supports an axially movable wedge 21 having the opposed inclined surfaces thereof operatively connected to the upper ends of the shoes through the medium of adjustment links 22 slidably supported in the bracket 19 for movement at right angles to the axis of the wedge and having head portions 23 at the outer ends thereof provided with radially extending slots of sufficient width to slidably receive the extensions 24 of the webs 25 at the upper ends of the shoes. The extensions 24 of the webs 25 are yieldably maintained in assembled relation within the slots in the heads 23 of the adjustment links by means of the retraction spring 25 interconnecting the upper ends of the brake shoes.

With the above arrangement, it will be noted that axial movement of the wedge 21 in an outward direction applies a relatively high unit pressure on the extremities of the extensions 24, through the medium of the adjustment links 22, to move the brake shoes in a direction toward the brake flange 17 on the drum. In order to avoid deforming the brake shoes by the exertion of relatively high unit pressures on the extremities of the extensions 24 of the webs 25, this unit pressure is reduced by increasing the area of engagement of the ends of the extensions 24 with the heads 23 of the adjustment links 22. This is accomplished by upsetting the extensions 24 to appreciably increase the thickness thereof.

The actuating means for the brake shoes is associated with the lower ends of the shoes and comprises a cam 27 rockably supported on a shouldered stud 28 fixed to the backing plate 12. The cam 27 is provided with an enlarged opening 29 therethrough loosely receiving the stud 28, and is located between the lower extensions 30 of the webs 25 of the brake shoes and the backing plate 12. It will be noted from Figure 11 that the extremities of the extensions 30 of the webs 25 are recessed, as at 31, for abutting engagement with the stud 28 in the released position of the brake. The lower ends of the shoes are urged into engagement with the stud by means of a retracting spring 32 interconnecting the lower ends of the shoes, and axial displacement of the lower ends of the shoes in the direction away from the cam 27 is prevented by means of the plate 33 fixed to the shouldered stud 28 in a position to engage the front sides of the extensions 30 of the brake shoe webs 25.

In order to expand or move the brake shoes outwardly into engagement with the brake flange 17 of the drum upon rocking the cam in one direction, suitable projections 34 are formed on the cam at opposite sides of the stud 28 and extend between the extremities of the extensions 30 of the brake shoe webs. The arrangement is such that when the cam is rocked in the direction of the arrow 35 in Figure 11 by the actuating lever 36, the inner projection 34 on the cam moves the actuator end of the primary shoe 14 outwardly into engagement with the brake flange, and the outer projection 34 on the cam lifts the anchor end of the secondary shoe 15 into engagement with the brake flange. This particular method of actuation is advantageous since it effects a raising of the secondary shoe into engagement with the brake flange of the drum in the direction of rotation of the latter and thereby greatly increases the effectiveness of the secondary shoe.

It will be noted from the foregoing, that the unit pressures exerted on the extremities of the extensions 30 of the brake shoe webs to move the shoes outwardly in the manner previously set forth, are relatively high and in order to prevent deforming of the brake shoes, the unit pressures are minimized by increasing the area of contact of the projections 34 with the extremities of the extensions 30. This is accomplished by upsetting the extensions to appreciably increase the thickness thereof, as shown in Figure 13 of the drawings. Also, the radial dimension of the end portions of the extensions 30 are increased by the upsetting operation, and this is desirable in that it permits the use of relatively low ratio cam spreaders without the necessity of resorting to cast shoes or building up the extensions of the webs by welding separate pieces thereto. In this connection, attention is again called to Figure 11, wherein it will be noted that as the distance between the projections 34 on the cam 27 is increased, the radial extent of the adjacent edges of the extensions 30 must also be increased to provide the desired contact throughout brake application.

Referring now more in detail to the method of forming the shoes described above, and with special reference to Figures 1 to 10 inclusive, it will be noted that a strip A of T-shaped mill section stock is provided having a length sufficient to form one shoe. The blank A is rolled, or otherwise fashioned, to form the arcuate section B shown in Figure 3 with the web C of the T section extending inwardly from the flanges D of this section. The extremities of the flanges D are cut away, and this operation may be effected either before the blank is formed to the contour shown in Figure 3, or after the latter operation. In any event, upon completion of the operation shown in Figure 3, the extremities of the web C extend beyond the opposite ends of the flanges D and are substantially straight.

Upon completion of the operation shown in Figure 3, the substantially straight extensions of the webs C are upset in the manner shown in Figures 4 to 8 inclusive, to provide the opposite ends of the shoes with the extensions 24 and 30, respectively. For the purpose of illustration, I have shown one method of procedure that may be followed in upsetting the extensions of the webs of the brake shoes. In the present instance, a die E having complementary sections of the contour shown in Figure 10 is assembled with the lower extension of the brake shoe in the manner shown in Figure 5, and a plunger F is forced into the die in the manner shown in Figure 8 to upset the end portion of the extension to the contour of the die cavity G. It will be noted from the several figures that the depth of the die cavity is substantially greater than the normal thickness of the web, and that the width of the die cavity is substantially greater than the radial dimension of the web. As a result, the lower end of the shoe is formed not only thicker, but substantially wider radially of the shoe, and this is desirable since it affords a substantially greater area of contact with the actuator. The upper end of the shoe may be upset in a similar manner by the use of a die having a cavity corresponding to the desired shape of the upper end of the shoe. Upon completion of the upsetting operations, the lower ends of the shoes are formed with the recesses 31 to receive the opposite side portions of the stud 28 in released position of the brake.

With my improved shoe construction, previously described, the unit pressures at both the adjustment and actuator ends of the shoes may be reduced to such an extent as to preclude deforming the edges of the web portions of the shoes during brake application, even though the shoes are formed of mill section stock. This arrangement is also important in that it offers the possibility of reducing the depth of the central portion of the webs of the shoes to increase the flexibility of the latter, and at the same time provides the desired area of contact with the actuator and adjustment device at the points of greatest pressure. It will also be observed that my improved shoe construction renders it possible to employ a spreader type actuator of a relatively low ratio, and this is desirable in that it provides for reducing pedal pressures.

What I claim as my invention is:—

1. Those steps in the method of forming a brake shoe of substantially T-shaped cross section which consist in fashioning a strip of T section stock to form an arcuate section with the web of the T extending radially inwardly from the flange thereof, removing portions of the flange of the T at opposite ends of the section, and upsetting one of the ends of the web to provide an extended bearing area at the edge of said end of the web.

2. Those steps in the method of forming a brake shoe of substantially T-shaped cross section which consist in fashioning a strip of T section stock to form an arcuate section with the web of the T extending radially inwardly from the flange thereof, removing portions of the flange of the T at opposite ends of the section, and upsetting both the ends of the web to increase the thickness of said ends.

3. Those steps in the method of forming a brake shoe of substantially T-shaped cross section which consist in fashioning a strip of T section stock to form an arcuate section with the web of the T extending radially inwardly from the flange thereof, removing portions of the flange of the T at opposite ends of the section, and increasing the depth and thickness of one end of said web by upsetting said end.

4. Those steps in the method of forming a brake shoe of substantially T-shaped cross section which consist in fashioning a strip of T section stock to form an arcuate section with the web of the T extending radially inwardly from the flange thereof, removing portions of the flange of the T at opposite ends of the section, upsetting one end of the web to increase the bearing area of the edge of said end, and increasing the depth and thickness of the opposite end of the web by upsetting said end.

CHARLES W. SINCLAIR.